(12) United States Patent
Zihnioglu

(10) Patent No.: US 11,722,577 B2
(45) Date of Patent: Aug. 8, 2023

(54) PROXYING TCP FINGERPRINTS

(71) Applicant: Webshare Software Company, Walnut, CA (US)

(72) Inventor: Asim Utku Zihnioglu, Walnut, CA (US)

(73) Assignee: Webshare Software Company, Covina, CA (US)

( * ) Notice: Subject to any disclaimer, the term of this patent is extended or adjusted under 35 U.S.C. 154(b) by 37 days.

(21) Appl. No.: 17/468,594

(22) Filed: Sep. 7, 2021

(65) Prior Publication Data

US 2023/0071608 A1    Mar. 9, 2023

(51) Int. Cl.
*H04L 67/561* (2022.01)
*H04L 67/01* (2022.01)
*H04L 67/2866* (2022.01)
*H04L 101/663* (2022.01)

(52) U.S. Cl.
CPC ............ *H04L 67/561* (2022.05); *H04L 67/01* (2022.05); *H04L 67/2866* (2013.01); *H04L 2101/663* (2022.05)

(58) Field of Classification Search
None
See application file for complete search history.

(56) References Cited

U.S. PATENT DOCUMENTS

| | | | |
|---|---|---|---|
| 9,338,192 B1 | 5/2016 | He | |
| 2006/0029000 A1* | 2/2006 | Waldvogel | H04L 67/14 370/254 |
| 2009/0119407 A1 | 5/2009 | Krishnan | |
| 2014/0207845 A1* | 7/2014 | Han | H04L 43/16 709/203 |
| 2015/0033344 A9* | 1/2015 | Holloway | H04L 69/40 726/24 |
| 2017/0034029 A1* | 2/2017 | Gilad | H04L 43/06 |
| 2018/0145978 A1* | 5/2018 | Kim | H04L 41/0853 |
| 2019/0116103 A1* | 4/2019 | Ravid | H04L 43/106 |

(Continued)

OTHER PUBLICATIONS

European Patent Office, "Search Report" in Application No. 22194079. 4-1213, dated Dec. 23, 2022, 8 pages.

(Continued)

*Primary Examiner* — Mohamed Ibrahim
(74) *Attorney, Agent, or Firm* — Hickman Becker Bingham Ledesma LLP

(57) ABSTRACT

In some embodiments, a computer-implemented method for an automated proxying TCP fingerprints comprises: receiving, at a proxy server, a request from a source host, to establish a first communications connection between the source host and a destination host; establishing, by the proxy server, a second communications connection between the source host and the proxy server; determining a plurality of fingerprint values specific to the source host; establishing by the proxy server, using at least the plurality of fingerprint values specific to the source host, a third communications connection between the proxy server and the destination host; facilitating, by the proxy server, communications between the source host and proxy server via the second communications connection and between the proxy server and the destination host via the third communications connection.

16 Claims, 11 Drawing Sheets

(56) References Cited

U.S. PATENT DOCUMENTS

2019/0379916 A1    12/2019  Lan

OTHER PUBLICATIONS

Current Claims in Application No. 22194079.4-1213, dated Dec. 2022, 3 pages.
The International Searching Authority, "Search Report" in Application No. PCT/US2022/042611, dated Dec. 22, 2022, 11 pages.
Current Claims in Application No. PCT/US2022/042611, dated Dec. 2022, 2 pages.

* cited by examiner

PROXYING TCP FINGERPRINTS

TECHNICAL FIELD

The present disclosure relates to computer networking. More specifically, some embodiments of the present disclosure relate to automated proxying of TCP fingerprints of source hosts.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Transmission Control Protocol (TCP) fingerprinting usually involves collecting, by a destination host, configuration attributes of a source host. The configuration attributes may be collected during, for example, a communications session established between the source and destination hosts at the Layer 4 (i.e., a transport layer) of the OSI model. The configuration attributes of the source host that are collected during the transport session are referred to as TCP fingerprints of the source host.

Additional configuration attributes of a source host may be inferred from higher level communications exchanged during a session established between the source host and a destination host. For example, during an HTTP application session, identification of an operating system (OS) executing on the source host may be determined and used to infer the configuration attributes, also referred to as default TCP variables of the source host.

However, there are situations in which a source host may not want a destination host to collect TCP fingerprints of the source host. For example, if a source host collects sensitive information from several destination hosts and uses the collected information to rate the destination hosts, then the source host may not want the destination hosts to obtain the TCP fingerprints of the source host or use the TCP fingerprints to block the source host from collecting the information from the destination hosts.

One way that a source host may protect itself against TCP fingerprinting is to limit the type and amount of traffic to which the source host responds. For example, the source host may ignore requests that allow other computers to collect the TCP fingerprints of the source host.

However, that solution may not work in the networks in which a proxy server is implemented between a source host and a destination host. That is because one of the reasons for implementing the proxy is to use the proxy to support, not limit or ignore, the traffic exchanged between the source host and the destination host.

But still, in many situations, neither a source host nor a proxy wants a destination host to learn that the proxy is implemented between the destination host and the source host or that the source host is probing for sensitive data. For example, suppose that a source host is operated by a user or a company that collects pricing information of certain products offered by various retailers (e.g., destination hosts), and makes that information available to the public to allow the public to select those retailers that offer the lowest prices. In these situations, the retailers who offer higher prices would want to block the source host from obtaining the pricing information because they would not want to miss the trade opportunities.

This can be accomplished in many ways, including the computer network that implement proxies. For example, in a computer network that implements a proxy server, the proxy server can expose the TCP fingerprints of the proxy server to a destination host. The destination host can only receive the TCP fingerprints of the proxy server. The destination host then can compare the TCP fingerprints of the proxy server and the information exposed at higher protocols (e.g., HTTP User-Agent Header) to find inconsistencies. More specifically, suppose that the source host executes the Windows 10, and the proxy server executes the Linux 4.15. The source host can make an HTTP connection to the destination via the proxy. The source may send an HTTP User-Agent message with a field set to "Windows 10." Then, the destination host receives the TCP fingerprints of the proxy which indicate the Linux 4.15. Therefore, the destination host will detect inconsistency between Windows 10 and Linux 4.15. Once the destination host detects the inconsistency, the destination host can block the connection/price discovery requested by other host and servers.

Therefore, there is a need for developing mechanisms that allow a proxy server to prevent destination hosts from blocking other hosts and servers from accessing the destination hosts.

BRIEF DESCRIPTION OF THE DRAWINGS

Some embodiments of the present approach are illustrated by way of example, and not in way by limitation, in the figures of the accompanying drawings and in which like reference numerals refers to similar elements and in which.

DETAILED DESCRIPTION

Figure 1:
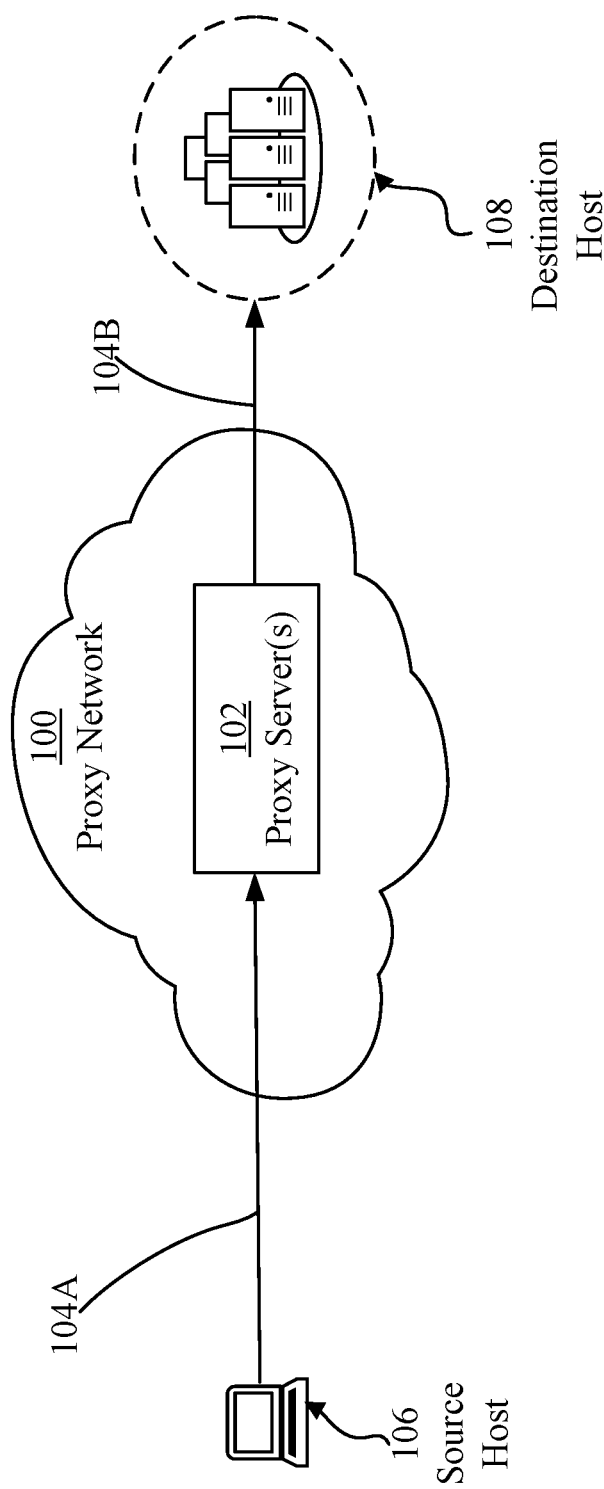
FIG. 1 is a diagram depicting an example proxy network in which some embodiments are implemented.

In the following description, for the purposes of explanation, numerous specific details are set forth in order to provide a thorough understanding of some embodiments of the present approach. It will be apparent, however, that some embodiments may be practiced without these specific details. In other instances, well-known structures and devices are shown in block diagram form in order to avoid unnecessarily obscuring some embodiments.

The detailed description is organized below according to the following outline:

| | |
|---|---|
| 1.0. | OVERVIEW |
| 2.0. | PROXY NETWORKS |
| 3.0. | TCP FINGERPRINT APPROACH |
| | 3.1. TCP THREE-WAY-HANDSHAKE PROCESS WITH A SOURCE |
| | 3.2. TCP CONNECTION VARIABLES |
| | 3.3. OS-DEPENDENT SETTINGS |
| | 3.4. FLOW CHART FOR COLLECTING A SOURCE CONFIGURATION |
| | 3.5. TCP THREE-WAY-HANDSHAKE PROCESS WITH A DESTINATION |
| | 3.6. FLOW CHART FOR USING TCP FINGERPRINTS OF A SOURCE TO PREVENT A DESTINATION HOST FROM DETECTING A PROXY IN A NETWORK |
| 4.0. | ROUND-TRIP-TIME APPROACH |
| | 4.1. ROUND-TRIP-TIME IN A NETWORK WITH NO PROXY |
| | 4.2. ROUND-TRIP-TIME IN A NETWORK WITH A PROXY |
| | 4.3. DELAYING RESPONSES TO CONTROL PACKETS |
| | 4.4. FLOW CHART FOR USING AN ALTERED ROUND-TRIP-TIME TO PREVENT A DESTINATION HOST FROM DETECTING A PROXY IN A NETWORK |
| 5.0. | MULTI-PROXY SOLUTIONS |
| 6.0. | HARDWARE IMPLEMENTATION |
| 7.0. | GENERAL CONSIDERATIONS |

1.0 Overview

Disclosed approaches are directed to preventing a destination host from detecting whether a source host uses a proxy to communicate with the destination host and, if a proxy is implemented, to prevent the destination host from blocking the proxy and the source from communicating with the destination host. The disclosed methods and systems are based on either a unique TCP fingerprinting approach, or a unique approach for altering a round-trip-time, or both. The disclosed methods are executed in a proxy server that is implemented between a source host and a destination host and that facilitates communications between the hosts.

The disclosed methods/systems that are based on a unique TCP fingerprinting approach include proxying, by a proxy server, TCP fingerprints and OS-specific information of a source host and using that information to prevent a destination host from detecting the presence of the proxy server implemented between the source host and the destination host, and to prevent the destination host from blocking the proxy and source host from communicating with the destination host. More specifically, the proxy obtains the TCP fingerprints of the source host, obtains OS-specific information of the source host, and uses the TCP fingerprints and default TCP variables inferred from the OS-specific information to establish a communications connection between the proxy and the destination host and then to prevent the destination host from detecting the presence of the proxy.

In some embodiments, a proxy server receives a request, from a source host, to establish a communications connection between the source host and a destination host. In response to receiving the request, the proxy server first establishes a communications connection between the source host and the proxy server.

As the proxy establishes the communications connection with the source host, the proxy determines TCP fingerprint values specific to the source host. The TCP fingerprint values may be determined during, for example, a three-way-handshake process executed between the source host and the proxy server to establish a communications connection between the source host and the proxy. The TCP fingerprints of the source host may be determined based on, at least in part, contents of a SYN packet and/or contents of an ACK packet communicated from the source host to the proxy server during the three-way handshake process.

Examples of the fingerprint values may include an initial time-to-live (TTL) (8 bits) gathered from a SYN packet of the three-way-handshake, a window size (16 bits) gathered from an ACK packet, a max segment size (16 bits) gathered from the SYN packet, and so forth. Details are described later.

Some of the plurality of fingerprint values specific to the source host may be also inferred based on, at least in part, an identification of an OS executing on the source host. The identification of the OS of the source may be determined from the communications exchanged at, for example, an application layer of the OSI model. From the OS identification, the proxy may infer the default TCP variables of the source host. The default TCP variables inferred from the OS identification may be then compared to the TCP fingerprints collected during the three-way-handshake process executed between the source host and the proxy server. The final TCP configuration values may be later used to establish the transport communications connection between the proxy server and a destination host.

Establishing a communications connection between a proxy server and a destination host may include generating, based on, at least in part, TCP fingerprint values and the default TCP variables (inferred from the identification of the OS executing on a source host), an interface configured to establish the communications connection between the proxy server and the destination host, and using the interface to initiate the communications connection between the proxy server and the destination host.

The interface may, for example, display the default TCP variables (inferred from the identification of the OS executing on a source host) and the TCP fingerprint values collected during the three-way-handshake process used to establish the communications connection between the source host and the proxy server, and then allow comparing the corresponding values. If they do not match, then the interface may provide the functionalities to overwrite the default TCP variables displayed in the interface using the corresponding TCP fingerprint values. Thus, the interface provides the functionalities for determining the parameters for a transport-layer communications connection between the proxy server and the destination host based on the setting used to establish the transport communications connection between the source host and the proxy server. Furthermore, the interface allows determining the parameters efficiently and quickly, and by using as few overwrites of the parameter values as needed.

Once the communications connection between the proxy server and the destination host is established, the proxy facilitates communications between the source host and the destination host via (1) the communications connection and between the source host and the proxy server, and (2) the communications connection between the proxy server and the destination host. The two connections create a virtual connection between the source host and the destination host.

However, since the communications connection between the proxy server and the destination host is established using the fingerprints of the communications connection established between the source host and the proxy server, the destination host is unable to detect the presence of the proxy server implemented between the destination host and the source host.

Furthermore, even if the destination host tries to block an IP address of the proxy server and thus tries to block the proxy server from communicating with the destination host, the proxy server can switch using another IP address, selected from a large pool of IP addresses assigned to the proxy. Therefore, even if the destination host tries to block the proxy server from contacting the destination host, the proxy may keep changing its own IP address to make the blocking efforts attempted by the destination host unproductive.

Another way to prevent a destination host from blocking certain hosts from communicating with the destination host is by using an altered round-trip-time approach to prevent the destination host from detecting that a proxy server is implemented between the destination host and a source host.

Generally, when a destination host sends a data packet to a source host, the destination host may measure a round-trip-time (RTT) of the data packet (a data packet sent and confirmed). The destination host may also send a control packet to the source host to measure a RTT of the control packet (a control packet sent, and a response received). The destination host may compare both RTTs to determine if they match. A data packet is usually sent to carry data to a source host, while a control packet is usually sent to test a communications connection that is established with the destination host. If no proxy server is implemented between the destination host and the source host, then both the data packet and the control packet reach the source host. However, if a proxy server is implemented between the destination host and the source host, then the data packet reaches the source host, but the control packet reaches the proxy server, not the source host. Therefore, if a proxy is implemented between the destination host and the source host, then the RTT of the data packet is longer than the RTT of the control packet.

The destination host compares an RTT of the data packet with an RTT of the control packet to determine whether the data packet and the control packet travelled along the same path. If the RTT of the data packet matches (more less) the RTT of the control packet, then the destination host may conclude that both packets reached the source host and were confirmed to the destination host. This happens when there is no proxy implemented between the destination host and the source host. However, if a proxy is implemented between the destination host and the source host, then the RTT of the data packet is longer than the RTT of the control packet since the control packet travels from the destination host to the proxy server, and a confirmation travels from the proxy server to the destination host. Based on that comparison, the destination host could determine whether a proxy is implemented between the destination and the source hosts.

In some embodiments, to prevent a destination host from detecting the presence of a proxy implemented between the destination and the source hosts, the proxy server determines a RTT associated with communicating a data packet from the proxy server to a source host and communicating a confirmation of the data packet from the source host to the proxy server. Upon receiving a TCP control packet from the destination host and that is destined to the source host, the proxy delays a response to the TCP control packet by the RTT associated with a round trip of a data packet from the proxy server to the source host and then of the confirmation from the source host to the proxy server. That way, the RTT of the data packet is more less the same as the RTT of the control packet, and therefore, the destination host may be unable to detect the presence of the proxy.

2.0. Proxy Networks

Proxy servers may be implemented as a network of proxy servers. A proxy server network may integrate, for example, a Web proxy server configured to handle Hypertext Transfer Protocol (HTTP) requests received from source hosts, transmit the HTTP requests to destination hosts, receive HTTP responses from the destination hosts, and communicate the HTTP responses to the source hosts. The proxy server network may also integrate Virtual Private Network (VPN) proxy servers that are configured to handle VPN-based requests and responses. Other types of proxy servers may also be integrated in the proxy server networks.

A proxy server acts on behalf of a source host and facilitates communications between the source host and a destination host. However, according to the disclosed approach, by establishing a communications connection between the proxy and the destination host using the TCP fingerprint information of a source host, the proxy prevents the destination host from blocking communications from both the source host and the proxy to the destination host. That is because each time the destination host attempts to block the communications from the source host, it actually blocks an IP address of the proxy; but since the proxy can easily change its own IP address (by selecting another IP address from the proxy's own pool of addresses), each of the attempts made by the destination host to block the source host is easily overcome by the proxy that starts using another IP address. This prevents the destination host from blocking the communications from the proxy to the destination host and the communications from source host to the destination.

Since the proxy has an almost unlimited pool of IP addresses that the proxy may use to connect to the destination host, the destination host may unlikely be successful in blocking the proxy from querying the destination host. That is because if the destination host blocks one IP address of the proxy, the proxy can start using another IP address to connect to the destination host, and that process can be repeated virtually infinitely. Therefore, the implementation of the disclosed approach in the proxy allows preventing the destination host from blocking the proxy, and since the proxy acts on behalf of the source host, the proxy server can prevent the destination host from blocking the source host.

A proxy server is usually configured as an intermediary between a source host and a destination host to facilitate implementations of security measures and to act as a shield between the source host and the destination host. Having the proxy as the intermediary allows preventing the source host and the destination host from being aware of the network address of another. The proxy may implement the shield-functionalities by configuring on the proxy, for example, a network address translation functionalities and a multi-hop routing functionalities for a proper routing of the requests and responses between the source and the destination. Functionalities of a proxy server acting as an intermediary may be implemented in a variety of ways. According to one approach, the proxy may hide a network address of a source host from a destination host and hide a network address of the destination host from the source host.

Typically, a network address of a computer implemented in a computer network is defined as an identifier of the computer, and may be included in, for example, headers of communications transmitted to and from the computer. Examples of communications protocols used to route the communications between the computers include the Internet Protocol (IP), the Transmission Control Protocol (TCP), the Hypertext Transfer Protocol (HTTP), the Voice over IP (VoIP) protocol, and the like.

Once a source host establishes a communications connection with a proxy server in a proxy-based network, the proxy establishes a communications connection with a destination host. The two communications connections may be "concatenated" and used as a virtual communications link between the source host and the destination host. The virtual link spans the communications connection between the source host and the proxy server and the communications connection between the proxy server and the destination host.

A proxy has usually assigned a pool of IP addresses that the proxy may use to mask actual IP addresses of other computers. For example, the proxy may mask the IP addresses of source hosts by assigning the proxy's own IP addresses to the IP addresses of the source hosts.

Typically, a TCP proxy, implemented using the SOCKS protocol or the HTTP protocol, connects two TCP communications connections between a source host and a destination host. A typical configuration may be represented as "source host←→TCP proxy server←→destination host. The TCP proxy can be used to send data to and receive data from the destination host without revealing the IP address of the source host.

FIG. 1 is a diagram depicting an example proxy network in which some embodiments are implemented. FIG. 1, the other drawing figures, and all of the description and claims in this disclosure are intended to present, disclose, and claim a technical system and technical methods in which specially programmed computers, using a special-purpose distributed computer system design, execute functions that have not been available before to provide a practical application of computing technology to the problem of machine learning model development, validation, and deployment. In this manner, the disclosure presents a technical solution to a technical problem, and any interpretation of the disclosure or claims to cover any judicial exception to patent eligibility, such as an abstract idea, mental process, method of organizing human activity or mathematical algorithm, has no support in this disclosure and is erroneous.

As shown, a proxy network 100 includes one or more proxy servers 102. Proxy network 100 facilitates communications between a source host 106 and a destination host 108 hosting, for example, a datacenter, a website, and the like.

In FIG. 1, the arrows between the various components represent the directions in which network connections are initiated. The network connections may be established in conformance with the HTTP protocol, the SOCKS protocol, and the like. The types of the communications connections are not to be viewed as limiting the presented approach.

At a high level of abstraction, upon receiving a request from a user of source host 106 to access destination host 108, proxy server 102 establishes a communications connection between proxy 102 and source host 106 and a communications connection between proxy 102 and destination host 108, and then bridges both connections to facilitate communications between the user of source host 106 and applications hosted by destination host 108.

If proxy 102 implements the SOCKS protocol, then a SOCKS proxy endpoint of proxy 102 initiates a network connection between proxy 102 and source host 106, as indicated using an arrow 104A. Furthermore, the SOCKS endpoint of proxy 102 initiates a network connection with a SOCKS endpoint of destination host 108, as indicated by an arrow 104B. Once both connections are established, network packets can flow between source host 106 to destination host 108 via proxy 102 in both directions. The network packet flow is not limited to the directions depicted by the arrows.

Proxy network 100 may be operated by a proxy service provider. For example, the proxy service provider may be a datacenter proxy service provider or a residential proxy service provider. Proxy network 100 may encompass many proxy endpoints in datacenters around the world. A purpose of the proxy provider is for the proxy provider to be able to offer to its users the ability to access destination hosts using network addresses registered in different countries or jurisdictions. This is useful to circumvent network firewall restrictions that prevent access to destination hosts by source hosts that have a source network address registered in a prohibited or unauthorized country or geographic area.

For the purposes of providing a clear example, FIG. 1 depicts only a single source host 106 communicating with a single destination host 108 via proxy network 100. However, proxy network 100 comprising many proxy servers can be used to connect many source hosts with many destination hosts. Thus, source host 106 is intended to be viewed as a representative of many source hosts, and destination host 108 is intended to be viewed as a representative of many destination hosts.

In some embodiments, source host 106 is an end-user personal computing device such as laptop computer, a desktop computer, a workstation computer, a tablet computing device, or a portable electronic computing device such as a smartphone. Source host 106 could also be an application server computer or a network computing device and does not need to be an end-user personal computing device.

Destination host 108 is an application server computer or a network computing device configured to implement a website or other online services in conjunction with other destination hosts. More generally, no particular type of computing device or network device is required to implement source host 106 or destination host 108.

Each of the computers implementing source host 106, proxy 102, or destination host 108 may have assigned a registered network address. The registered network addresses may be assigned by a regional Internet registry such as the African Network Information Center (AFRINIC), the American Registry for Internet Numbers (ARIN), the Asia-Pacific Network Information Centre (APNIC), the Latin America and Caribbean Network Information Centre (LACNIC), and the Réseaux IP Européens Network Coordination Centre (RIPE NCC). Network address geolocation databases and services exist for resolving a given network address to the geographic region in which it is registered.

Destination host 108 may be part of a website that uses a network firewall to restrict access to the website to only source network addresses registered in the United States. In that case, if source host 106 uses a network address registered in a European country, then source host 106 may not directly connect to destination host 108. The network firewall would prevent the direct network connection because the source network address of the network connection is not registered in the United States. This problem may be solved using proxy network 100 because source host 106 may access the website using proxy network 100.

Source host 106 may access destination host 108 using proxy network 100 by establishing a communications connection with an endpoint of proxy 102. Since typically, the communications connection is established over a public network such as the Internet, the proxy endpoint may be used to secure the network connection and keep the contents of the information transmitted via the network connection hidden from other users and computers that have access to the public network.

As part of establishing a network connection, source host 106 may specify, for example, a domain name, website name or other network address of a website of destination host 108 with which a user of source host 106 wants to interact. In addition, source host 106 may specify a target geographic area which may be a continent, country, city, region or state, or postal code.

The above-described computer hardware and software are presented for purposes of illustrating the basic underlying components that may be employed in a proxy network. The present approach, however, is not limited to any particular proxy network configuration. The present approach may be implemented in any type of proxy network capable of supporting the methodologies of the described embodiments.

3.0. TCP Fingerprint Approach

TCP fingerprinting, also known as TCP stack fingerprinting, involves an analysis of data fields in a TCP packet communicated via a communications session established at a transport layer of the OSI model with a source host. The TCP fingerprinting is used to identify configuration attributes of the source host. The information learned from the TCP fingerprint may include the specific attributes of the communications exchanged with the source host. An example of application programs configured to perform the TCP fingerprinting includes the network tool called nmap.

3.1. TCP Three-Way-Handshake Process with a Source

Figure 2A:
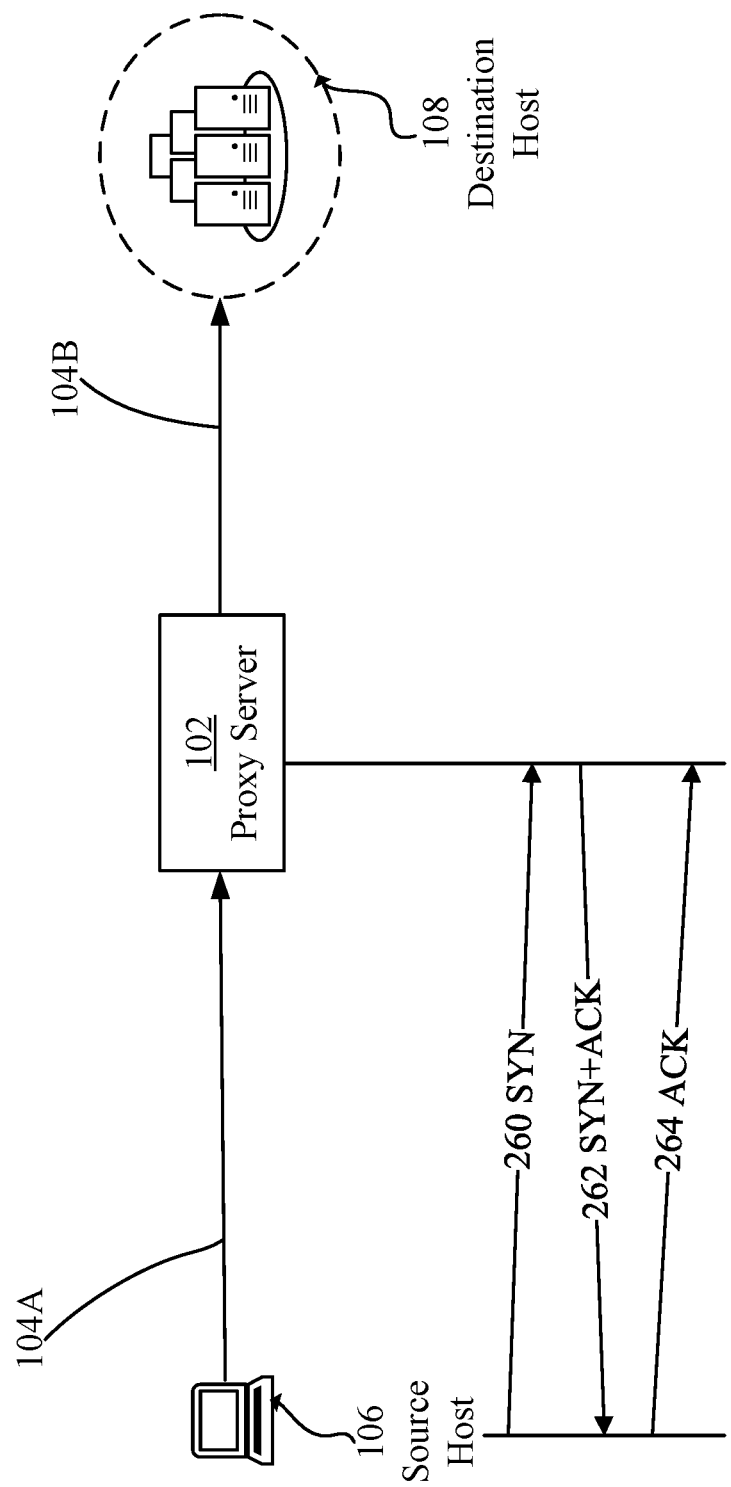
FIG. 2A is a diagram depicting an example process for establishing a communications connection between a source host and a proxy server according to some embodiments.

FIG. 2A is a diagram depicting an example process for establishing a communications connection between a source host and a proxy server according to some embodiments. In the depicted example, source host 106 is in a process of establishing a Layer 4 connection with proxy server 102.

A Layer 4 communications connection may be established using, for example, a three-way-handshake process. During the three-way-handshake process, proxy server 102 may collect TCP fingerprint information specific to source host 106.

As shown in FIG. 2A, to initiate a three-way-handshake process, source host 106 transmits a SYN request 260 to proxy server 102. This may be implemented by setting a SYN flag to 1 and sending a message with the SYN flag to proxy server 102, The message may also include some additional information like the sequence number (any random 32 bits number), the ACK flag set to 0, the window size, and the maximum segment size. For example, if the window size is 2000 bits and the maximum segment size is 200 bits, then a maximum of 10 data segments (2000/200=10) can be transmitted via the connection that is being established.

In response, proxy server 102 replies with a SYN+ACK message 262 to source host 106. After receiving SYN+ACK 262 from the proxy, source host 106 sends an ACK message 264 with a flag set to "1." The source host also advertises its window size and maximum segment size to proxy 102. After completion of this step, the connection is established from source host 106 to proxy server 102.

3.2. TCP Connection Variables

Each TCP connection has operational variables which are set by the underlying OS. Some of these variables, also referred to as TCP fingerprints, include:

Initial packet size (16 bits)—Gathered from the first SYN packet

Initial TTL (8 bits)—Gathered from the first SYN packet

Window size (16 bits)—Gathered from the first ACK packet

Max segment size (16 bits)—Gathered from the first SYN packet

Window scaling value (8 bits)—Gathered from the first SYN packet

"don't fragment" flag (1 bit)—Gathered from the first SYN packet

"sackOK" flag (1 bit)—Gathered from the first SYN packet

"nop" flag (1 bit)—Gathered from the first SYN packet

In some embodiments, an initial packet size (16 bits), gathered from the first SYN packet, is not used in the disclosed approach because, in some situations, it cannot be set reliably. Hence, in the drawings described below, the initial packet size attribute is not used for the TCP fingerprinting.

Figure 2B:
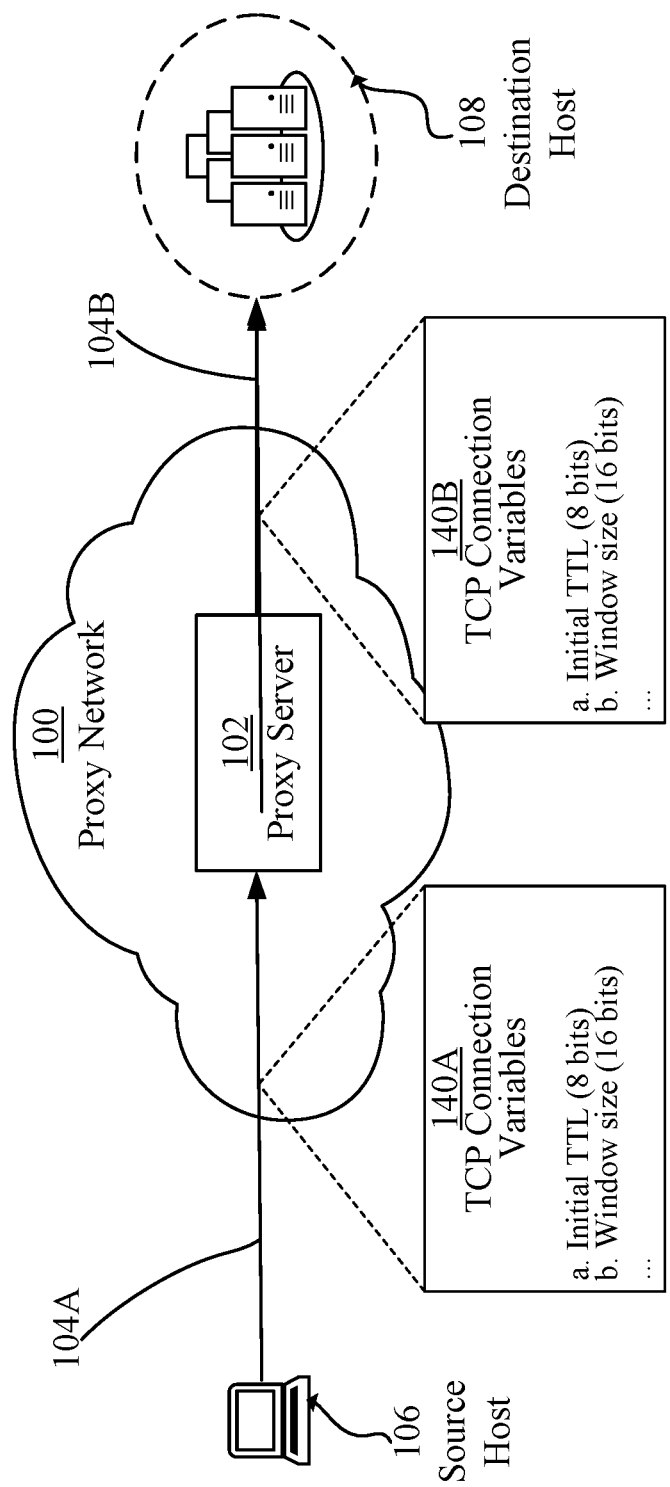
FIG. 2B is a diagram depicting an example process for collecting TCP fingerprints of a source host according to some embodiments.

FIG. 2B is a diagram depicting an example process for collecting TCP fingerprints of a source host according to some embodiments. In the depicted example, TCP connection variables 140A correspond to TCP fingerprints collected during establishing communications connection 104A. TCP connection variables 140A used in the disclosed approach include one or more of:

Window size (16 bits)—Gathered from the first ACK packet

Max segment size (16 bits)—Gathered from the first SYN packet

Window scaling value (8 bits)—Gathered from the first SYN packet

"don't fragment" flag (1 bit)—Gathered from the first SYN packet

"sackOK" flag (1 bit)—Gathered from the first SYN packet

"nop" flag (1 bit)—Gathered from the first SYN packet

As shown in FIG. 2B, TCP connection variables 140B correspond to TCP connection variables 140A. TCP connection variables 140B may be used to establish TCP communications connection 104B between proxy server 102 and destination host 108.

3.3. OS-Dependent Settings

TCP connection variables 140A (shown in FIG. 2A) specific to communications connection 104A between source host 106 and proxy server 102 are, by default, set by the underlying OS executing on source host 106. Each OS may have different default TCP variables. In fact, even different versions of the same OS may have different variables.

Proxy server 102 may detect an identification of the OS executing on source host 106 from communications exchanged via a communications session established in compliance with upper level protocols, such as the HTTP protocol executing at the Layer 7 of the OSI model. The HTTP protocol advertises the identifier of the OS executing on source host 106 in each request sent by source host 106.

Examples of default TCP variables specific to a source host executing, for example, Windows 10 include:

Initial TTL: 113

Window size: 1026

Max segment size: 1460

Window scaling value: 8

"don't fragment" flag: Is set
"sackOK" flag: Is set
"nop" flag: Set 3 times

Examples of default TCP variables specific to a source host executing, for example, Linux Kernel 5.4.0-72 include:

Initial TTL: 49
Window size: 502
Max segment size: 1460
Window scaling value: 7
"don't fragment" flag: Is set
"sackOK" flag: Is set
"nop" flag: Set 1 time Default TCP variables for other operating systems may be different than those described above.

Figure 2C:
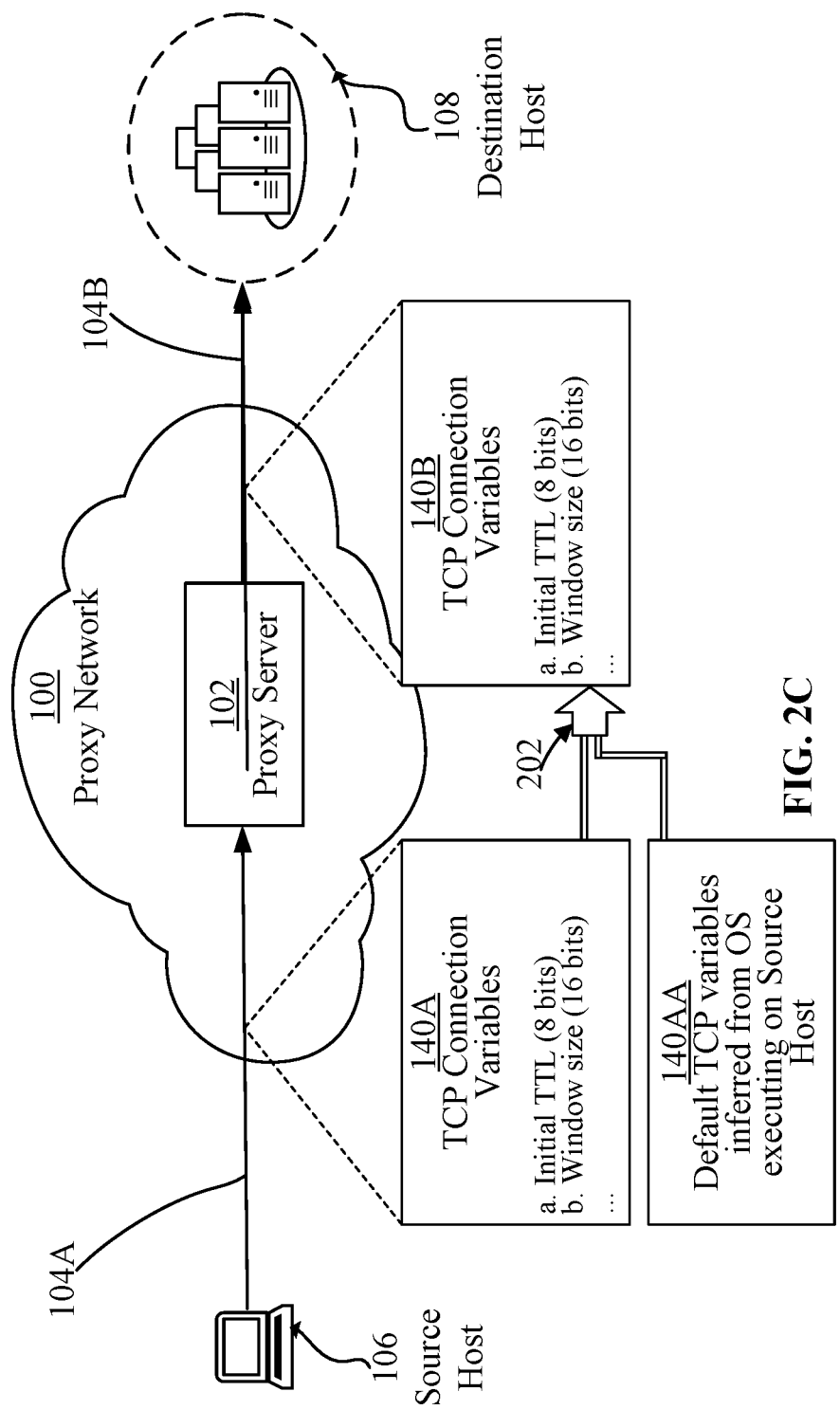
FIG. 2C is a diagram depicting an example process for determining configuration attributes for establishing a communications connection between a proxy server and a destination host according to some embodiments.

FIG. 2C is a diagram depicting an example process for determining configuration attributes for establishing a communications connection between a proxy server and a destination host according to some embodiments. As depicted in FIG. 2C, default TCP variables (element 140AA) specific to an OS executing on source host 106 are inferred from the identifier of the OS and may be compared (element 202) with TCP fingerprint variables 140A determined during establishing a TCP communications connection between source host 106 and proxy server 102. If any of default TCP variables 140AA specific to the OS is different than a corresponding TCP fingerprint variable determined during the TCP communications session, then a particular default TCP variable may be overwritten by the corresponding TCP fingerprint variable because the corresponding TCP fingerprint variables are more reliable than the default TCP variables.

The resulting TCP fingerprint variables are referred to as TCP connection variables 140B and are used to establish a communications connection between proxy server 102 and destination host 108.

3.4. Flow Chart for Collecting a Source Configuration

Figure 3:
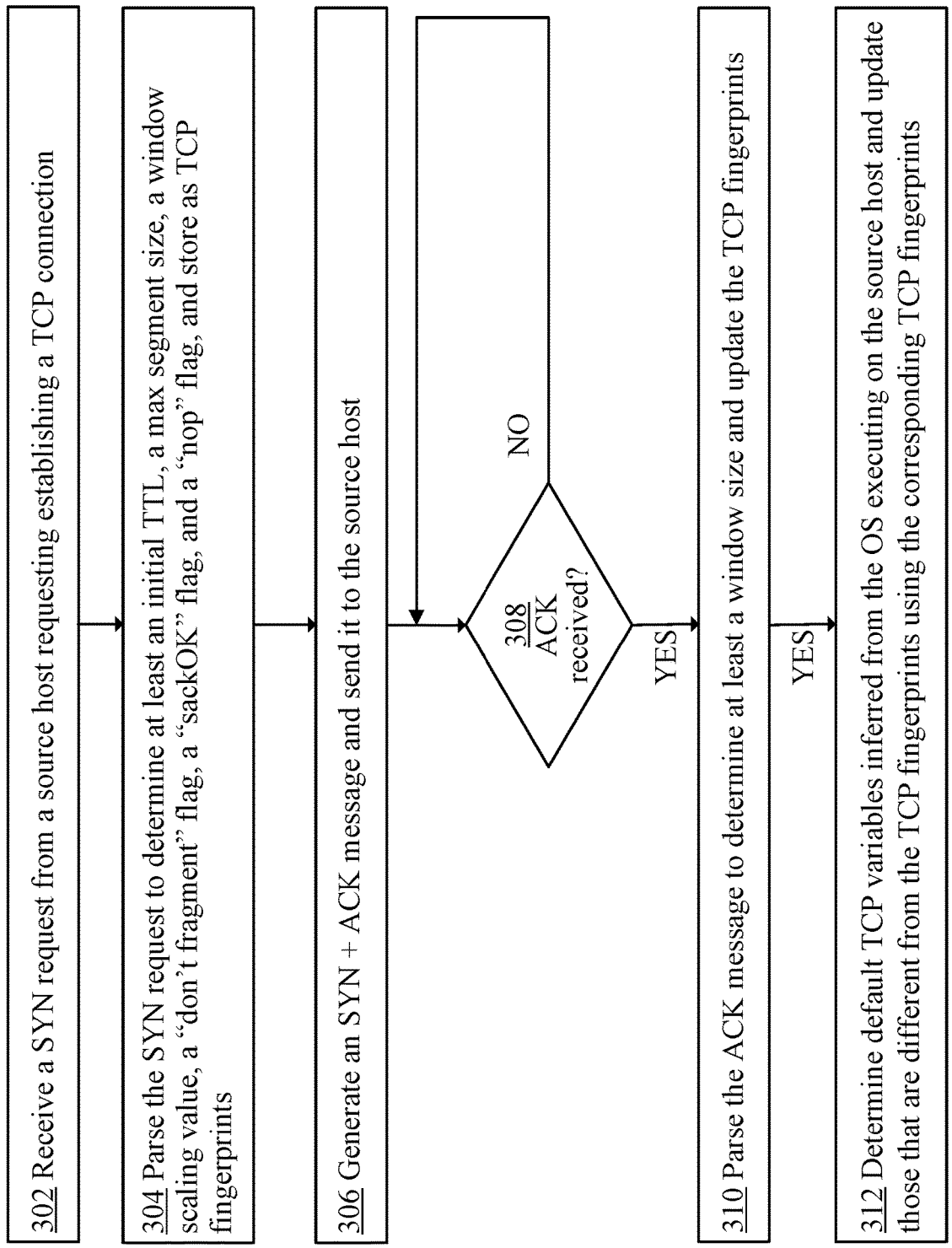
FIG. 3 is a flow chart depicting an example implementation of proxying TCP fingerprints of a source host according to some embodiments.

FIG. 3 is a flow chart depicting an example implementation of proxying TCP fingerprints of a source host according to some embodiments. The steps depicted in FIG. 3 are performed by proxy server 102 as source host 106 attempts to establish a communications connection with proxy server 102.

In step 302, a proxy server receives a SYN request from a source host that attempts to establish a communication connection from the source host to the proxy server. An example of the SYN request has been described before.

In step 304, the proxy server parses the SYN request to determine various TCP fingerprints of the source host, including, at least, an initial TTL, a max segment size, a window scaling value, a "don't fragment" flag, a "sackOK" flag, and a "nop" flag, which are examples of TCP fingerprint information specific to the source host. Details about the TCP fingerprints have been described before. Also in this step, the proxy server saves, or stores, the TCP fingerprint values extracted from the SYN request.

In step 306, the proxy server generates a SYN+ACK message and sends the message to the source host. Details of the SYN+ACK message have been described before.

In step 308, the proxy server tests whether an ACK message has been received from the source host. If it has, then the proxy server proceeds to perform step 310; otherwise, the proxy server awaits the ACK message in step 308.

In step 310, the proxy server parses the received ACK message to determine additional TCP fingerprints of the source host, including, for example, a window size. Also in this step, the proxy server saves, or stores, the TCP fingerprint values extracted from the ACK message in association with the TCP fingerprints extracted from the SYN request.

In step 312, the proxy server infers default TCP variables from an identification of the OS executing on the source host and updates those that are different from the TCP fingerprints using the corresponding TCP fingerprints.

3.5. TCP Three-Way-Handshake Process with a Destination

Figure 2D:
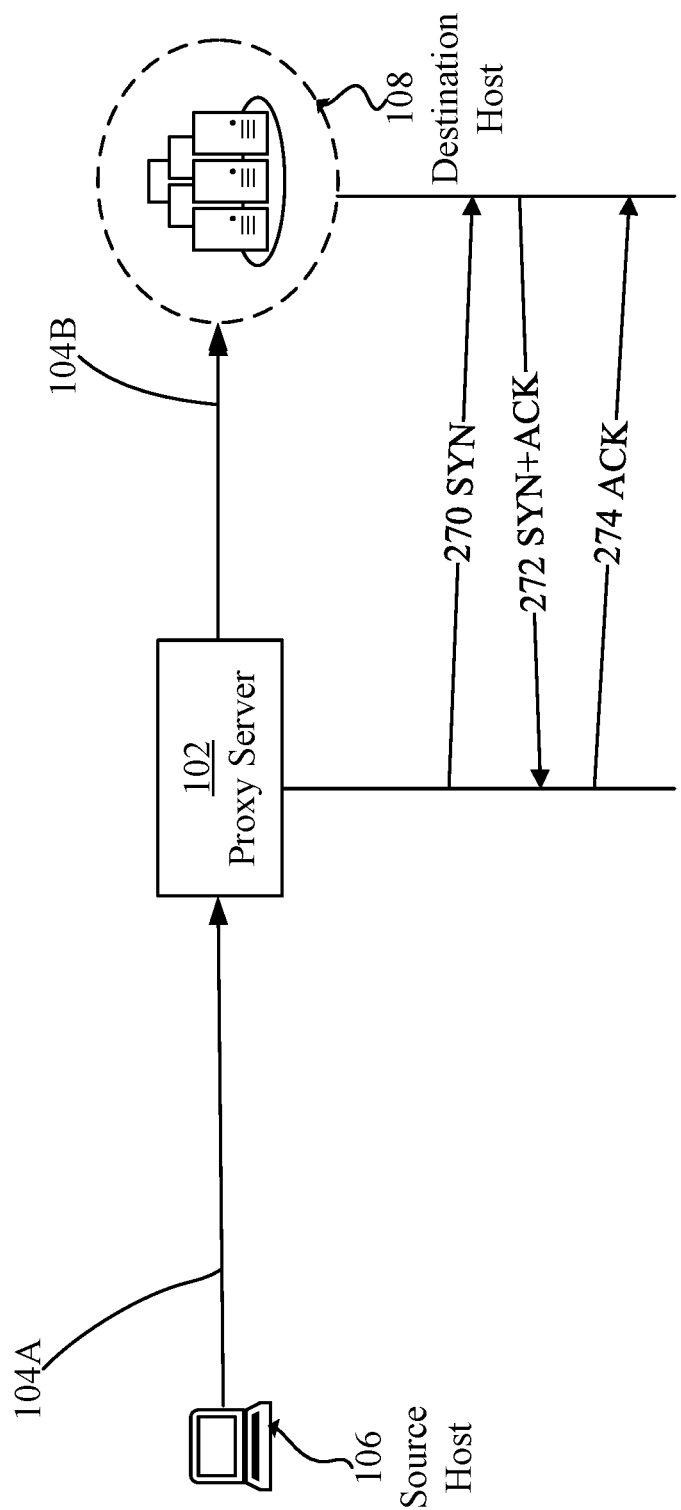
FIG. 2D is a diagram depicting an example process for using configuration attributes of a source host to establish a communications connection between a proxy server and a destination host according to some embodiments.

FIG. 2D is a diagram depicting an example process for using configuration attributes of a source host to establish a communications connection between a proxy server and a destination host according to some embodiments. In the depicted example, proxy server 102 is in a process of establishing a Layer 4 connection with destination host 108. The Layer 4 communications connection 104B may be established using, for example, a three-way-handshake process. To establish connection 104B, proxy server 102 may use the TCP fingerprint information specific to source host 106.

As shown in FIG. 2D, to initiate a three-way-handshake process, proxy server 102 transmits a SYN 270 to destination host 108. This may be implemented by setting a SYN flag to 1 and sending the message with the SYN flag to destination host 108. The message may also include some additional information like the sequence number (any random 32 bits number), an ACK flag set to 0, and the TCP fingerprint information (described above) of source host 106. The TCP fingerprint information of source host 106 may include the window size, and the maximum segment size.

In response, destination host 108 replies with a SYN+ACK 272 to proxy server 102. After receiving SYN+ACK 272 from the proxy, destination host 108 sends an ACK 274 with a flag set to "1." Destination host 108 also advertises its window size and maximum segment size to proxy 102. After completion of this step, the connection is established between proxy server 102 and destination host 108.

Figure 4:
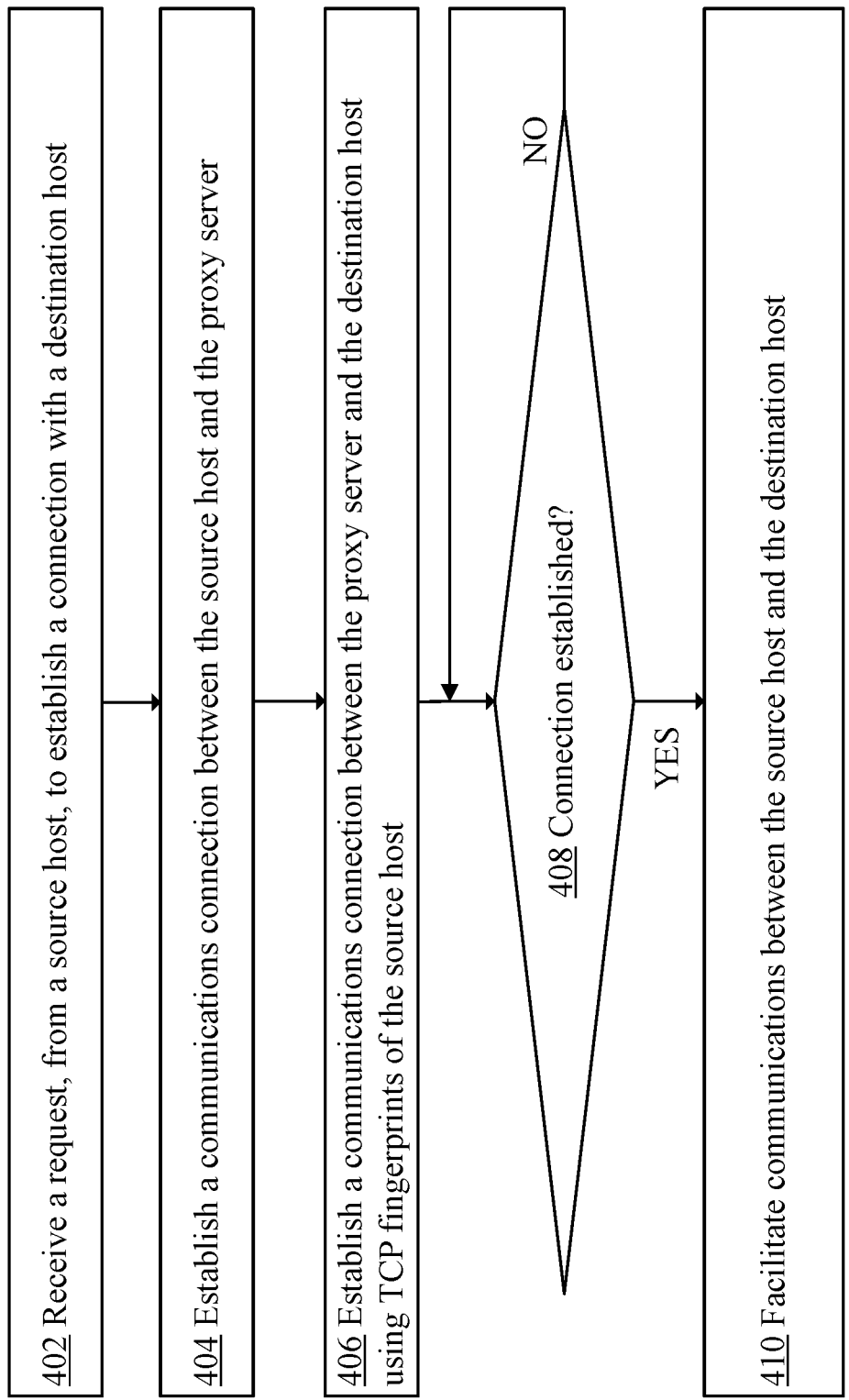
FIG. 4 is a flow chart depicting an example implementation of a process for using TCP fingerprints of a source host to prevent a destination host from detecting presence of a proxy server according to some embodiments.

3.6. Flow Chart for Using TCP Fingerprints of a Source to Prevent a Destination Host from Detecting a Proxy in a Network FIG. 4 is a flow chart depicting an example implementation of a process for using TCP fingerprints of a source host to prevent a destination host from detecting presence of a proxy server according to some embodiments. The steps depicted in FIG. 4 are performed by proxy server 102 as source host 106 attempts to establish a communications connection with destination host 108.

In step 402, a proxy server receives a request, from a source host, to establish a communications connection between the source host and a destination host.

In step 404, in response to receiving the request, the proxy server first establishes a communications connection between the source host and the proxy server. The process of establishing the connection between the source host and the proxy server is described in FIG. 3. During that process, the proxy server determines, or otherwise infers, TCP fingerprints of the source host, as described in FIG. 3.

Some of the TCP fingerprint values specific to the source host may be inferred based on, at least in part, an identification of an OS executing on the source host. The identification of the OS of the source may be determined from the communications session exchanged at, for example, an application layer of the OSI. From the OS identification, the proxy may infer the default TCP variables of the source host. The default TCP variables inferred from the OS identification may be then refined using the TCP fingerprints collected during the three-way-handshake process executed between the source host and the proxy server.

In step 406, the proxy server establishes, using at least some of the TCP fingerprint values specific to the source host, a communications connection between the proxy server and the destination host. Establishing the communications connection between the proxy server and the destination host may include generating, based on at least in part the TCP fingerprint values, a SYN request and sending the SYN request from the proxy server to the destination host.

In response to sending the SYN request, the proxy server receives a SYN+ACK message from the destination host. In response to receiving the SYN+ACK message, the proxy server generates, based on the TCP fingerprints of the source host, an ACK message, and transmits the ACK message to the destination host.

In some embodiments, the process of establishing a communications connection between the proxy server and the destination host may be implemented in a user interface configured to generate the specific SYN and ACK messages. The interface may be used to initiate the communications connection between the proxy server and the destination host. The interface may, for example, be configured to display the default TCP variables inferred from an identifier of the OS executing on the source host and the TCP fingerprint values collected during a three-way-handshake process used to establish a communications connection between the source host and the proxy server, and then to compare the corresponding values. If corresponding values do not match, then the interface may provide the functionalities to overwrite the particular default TCP variables inferred from the identifier of the OS using the corresponding TCP fingerprint values. The interface may be configured to provide an efficient and convenient tool for determining the parameters for a transport-layer communications connection between the proxy server and the destination host based on the setting used to establish the transport communications connection between the source host and the proxy server.

In step 408, the proxy server tests whether the communications connection between the proxy server and the destination host has been established. If it has, then the proxy server proceeds to perform step 410. Otherwise, the proxy server continues waiting in step 408.

In step 410, once the communications connection between the proxy server and the destination host is established, the proxy server starts facilitating communications between the source host and the destination host. The communications connection between the source host and the proxy server and the communications connection between the proxy server and the destination host form a virtual communications connection between the source host and the destination host.

Since the communications connection between the proxy server and the destination host is established using the TCP fingerprints of the communications connection established between the source host and the proxy server, the destination host is unable to detect the presence of the proxy server implemented between the destination host and the source host.

Furthermore, even if the destination host attempts to block an IP address of the proxy server to block the proxy server from communicating with the destination host, the proxy server can start using another IP address, selected from a large pool of IP addresses assigned to the proxy, to prevent the blocking. Thus, even if the destination host continues to block the proxy server from contacting the destination host, the proxy can continue changing its own IP address making the blocking efforts fail.

4.0. Round-Trip-Time Approach

A proxy server may prevent a destination host from blocking certain hosts from communicating with the destination host by using an altered round-trip-time approach.

Figure 5A:
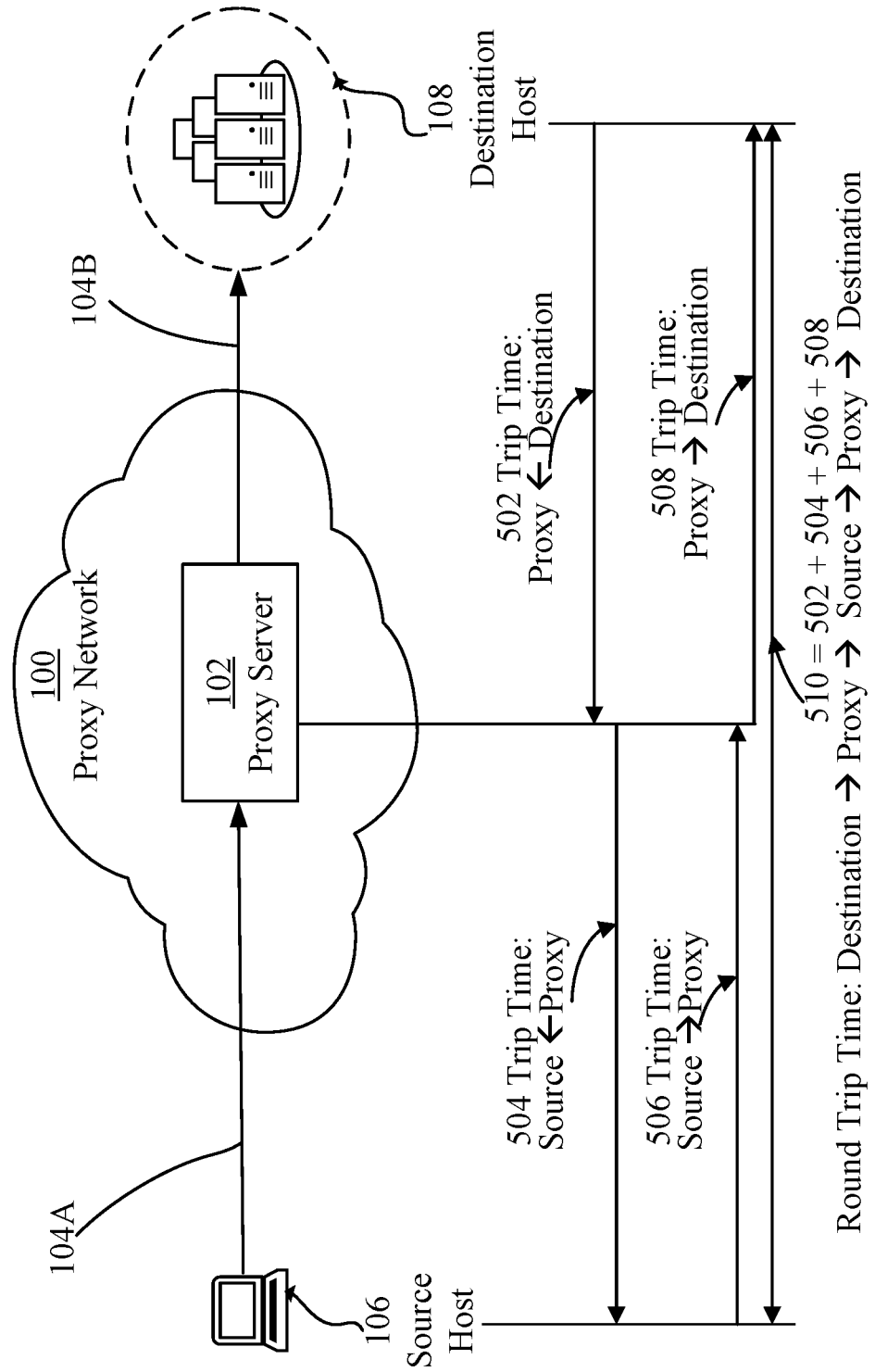
FIG. 5A is a diagram depicting example trip times in a proxy-based network according to some embodiments.

FIG. 5A is a diagram depicting example trip times in a proxy-based network according to some embodiments. Suppose that destination host 108 sends a data packet to source host 106 and measures a round-trip-time (RTT) 510 of the data packet from destination host 108 to the source and then a confirmation of the data packet from the source to the destination.

Furthermore, suppose that destination host 108 sends a control packet to source host 106 to measure a RTT of the control packet and a response to the control packet. A data packet is usually sent to a requester of the data, i.e., a source host, while a control packet is usually sent to an endpoint of the communications connection that is established with the destination host.

Destination host 108 may compare both RTTs to determine if they match. If the RTTs match, then both the data packet and the control packet have reached the source host. If they do not match, then one of the packets (e.g., the control packet) has not reached the source host.

4.1. Round-Trip-Time in a Network with No Proxy

If no proxy server is implemented between a destination host and a source host, then both the data packet and the control packet, sent by the destination host, are received by the source host, and responses to both packets are sent by the source host. Thus, if no proxy server is implemented between destination host 108 and source host 106, then RTT 510 includes a trip time (TT) from destination 108 to source 106 and a TT from source 106 to destination 108. More specifically, as shown in FIG. 5A, RTT 510 includes a trip time (TT) 502 from destination 108 to proxy 102, a TT 504 from proxy 102 to source host 106, a TT 506 from source host 106 to proxy 102, and a TT 508 from proxy 102 to destination 108.

4.2. Round-Trip-Time in a Network with a Proxy

However, if proxy server 102 is implemented between destination host 108 and source host 104, then the data packet is received by proxy 102, then by source host 106, but the control packet is received by proxy server 102, but not by source host 106. Thus, if proxy server 102 is implemented between destination host 108 and source host 106, then RTT 510 for a data packet includes TT 502 from destination 108 to proxy 102, TT 504 from proxy 102 to source 106, TT 506 from source 106 to proxy 102, and TT 508 from proxy 102 to destination 108; but a round-trip-time for a control packet includes TT 502 from destination 108 to proxy 102, and TT 508 from proxy 102 to destination 108

Therefore, if a proxy is implemented between the destination host and the source host, then the RTT of the data packet is longer than the RTT of the control packet.

The destination host may compare the RTT of the data packet with the RTT of the control packet to determine whether the data packet (and its response) and the control packet (and its response) travelled indeed along the same path. If the RTT of the data packet matches (more less) the RTT of the control packet, then the destination host may conclude that both packets travelled along the same path, i.e., the data packet from the destination host to the source host and the response from the source host to the destination host. However, if a proxy is implemented between the destination host and the source host, then the RTT of the data packet is longer than the RTT of the control packet since the control packet travels from the destination host to the proxy server, and then the response travels from proxy server to the destination host. Based on that comparison, the destination could determine whether a proxy is implemented between the destination and the source hosts.

4.3. Delaying Responses to Control Packets

To prevent a destination host from detecting the presence of a proxy between the destination and a source host, a proxy server may determine a RTT associated with communicating a data packet from the proxy server to a source host and then a response from the source host to the proxy server. Upon receiving a TCP control packet from a destination host and that is destined to the source host, the proxy delays a response to the TCP control packet by the RTT associated with a round trip of a data packet from the proxy server to the source host and the response from the source host to the proxy server.

By delaying the moment at which the response to the TCP control packet is sent from the proxy to the destination host, the proxy makes the destination host assume that the RTT of a TCP control packet and the RTT of a control packet are the same, where actually they are not.

Figure 5B:
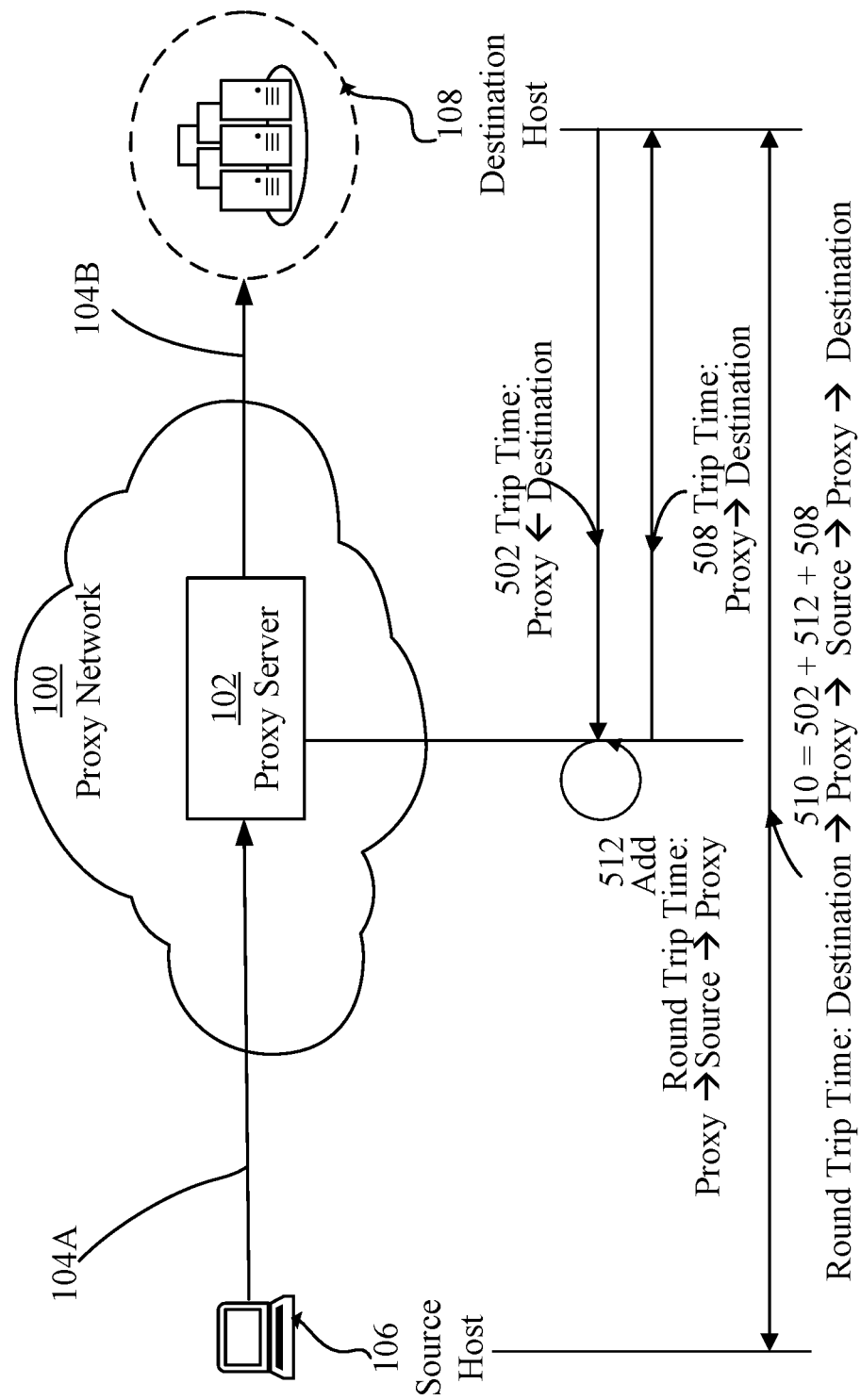
FIG. 5B is a diagram depicting an example process for using an altered round-trip-time to prevent a destination host from detecting the presence of a proxy server according to some embodiments.

FIG. 5B is a diagram depicting an example process for using an altered round-trip-time to prevent a destination host from detecting the presence of a proxy server according to some embodiments. The approach depicted in FIG. 5B allows proxy server 102 to determine a RTT of transmitting a data packet from proxy server 102 to source host 106 and a response from source host 106 to proxy 102 and delaying sending a response to a control packet by the determined RTT.

Suppose that proxy 102 sent a data packet to source host 106 and measured an RTT 512 once receiving of the data packet is confirmed by source host 106 to proxy server 102. Merely to illustrate a simple example, suppose that RTT is 100 ms.

Suppose that proxy 102 received from destination host 108, a control packet that was meant for source host 106. An example of the control packet may include a SYN packet sent to establish a TCP connection between destination host 108 and proxy server 102. Suppose that a TT 502 for sending the control packet from destination host 108 to proxy 102 is 50 ms.

To prevent destination host 108 from detecting the presence of proxy 102 implemented between destination host 108 and source 106, proxy 102 may delay sending a response to the control packet by TT 512 to cause destination host 108 to believe that the response was sent directly from source host 106 and that no proxy 102 is implemented between destination host 108 and source 106. An example of a response to the control packet SYN may be a SYN+ACK control packet that a recipient of the SYN sends to a sender of the SYN.

By delaying the moment at which the response to the TCP control packet is sent from the proxy to the destination host, the proxy makes the destination assume that the TCP control packet was indeed received by the source host and that the source host transmitted the response to the TCP control packet to the destination host.

Figure 6:
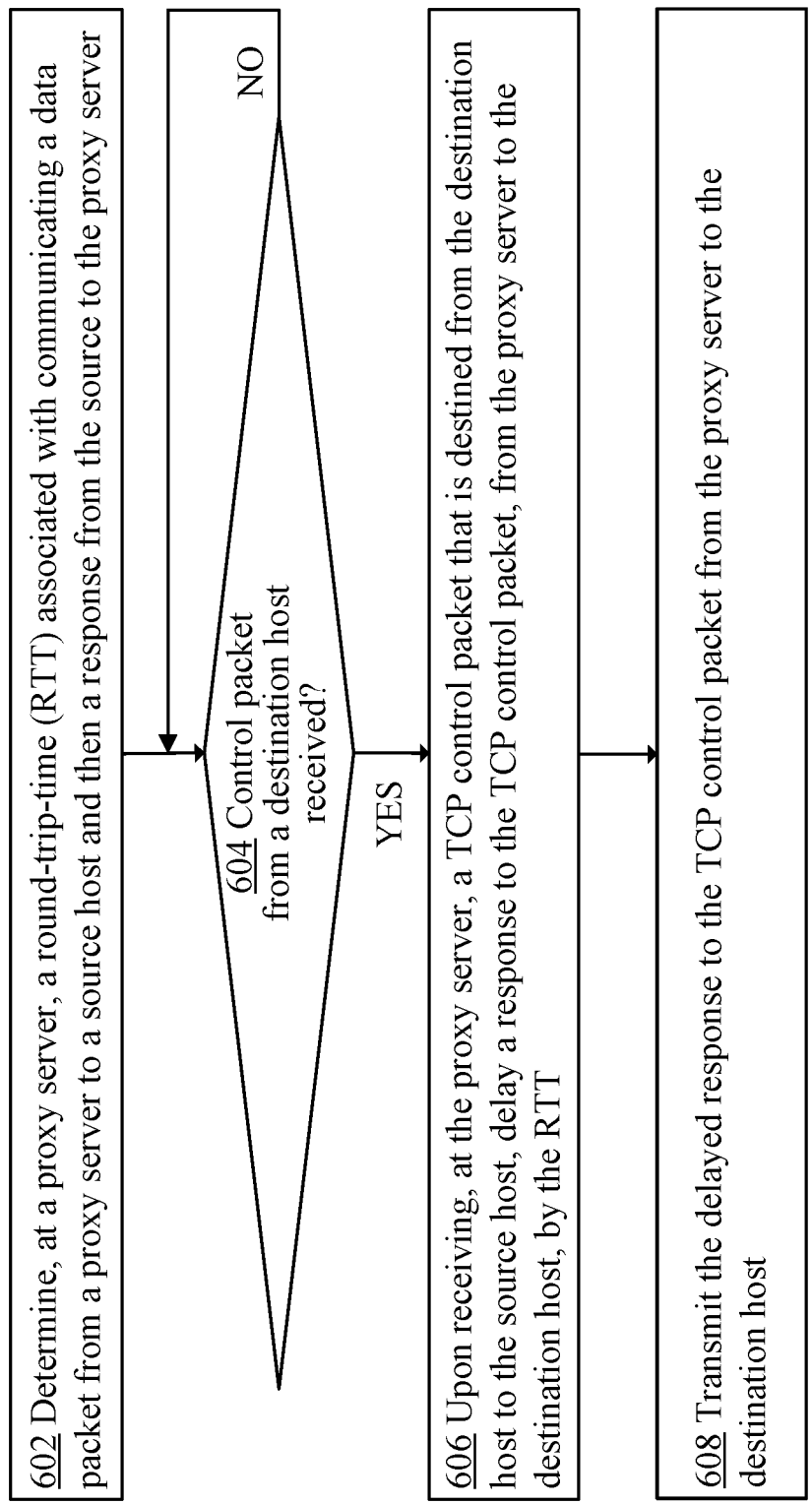
FIG. 6 is a flow chart depicting an example implementation of a process for using an altered round-trip-time to prevent a destination host from detecting presence of a proxy server according to some embodiments.

4.4. Flow Chart for Using an Altered Round-Trip-Time to Prevent a Destination Host from Detecting a Proxy in a Network FIG. 6 is a flow chart depicting an example implementation of a process for using an altered round-trip-time to prevent a destination host from detecting presence of a proxy server according to some embodiments. The steps depicted in FIG. 6 may be performed by proxy server 102.

In step 602, a proxy server determines a round-trip-time delay associated with communicating a data packet from the proxy server to a source host and then a response from the source host to the proxy server.

In step 604, the proxy server tests whether a control packet from a destination host, intended to the source host, has been received. If the control packet has been received, then the proxy server proceeds to perform step 606. Otherwise, the proxy server continues awaiting the control packet in step 604.

In step 606, upon receiving, at the proxy server, a TCP control packet that is destined from the destination host to the source host, the proxy server delays a response to the TCP control packet, from the proxy server to the destination host, by the round-trip-time delay.

In step 608, the proxy server transmits the delayed response to the control packet from the proxy server to the destination host.

5.0. Multi-Proxy Solutions

In some embodiments, both approaches described above may be implemented in a proxy network comprising a plurality of proxy servers. For example, the proxies may handle communications between pairs of source-destination hosts, and each proxy may implement the above described approaches for the source-destination pair that the proxy handles.

6.0. Hardware Implementation

According to some embodiments of the present approach, the techniques described herein are implemented by at least one computer system. The techniques may be implemented in whole or in part using a combination of at least one server computer or other computer systems that are coupled using a network, such as a packet data network. The computer systems may be hard-wired to perform the techniques or may include digital electronic devices such as at least one application-specific integrated circuit (ASIC) or field programmable gate array (FPGA) that is persistently programmed to perform the techniques or may include at least one general purpose hardware processor programmed to perform the techniques pursuant to program instructions in firmware, memory, other storage, or a combination. Such computer systems may also combine custom hard-wired logic, ASICs, or FPGAs with custom programming to accomplish the described techniques.

The computer systems may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired or program logic to implement the described techniques, one or more virtual computing machines or instances in a data center, or a network of server computers or personal computers.

Figure 7:
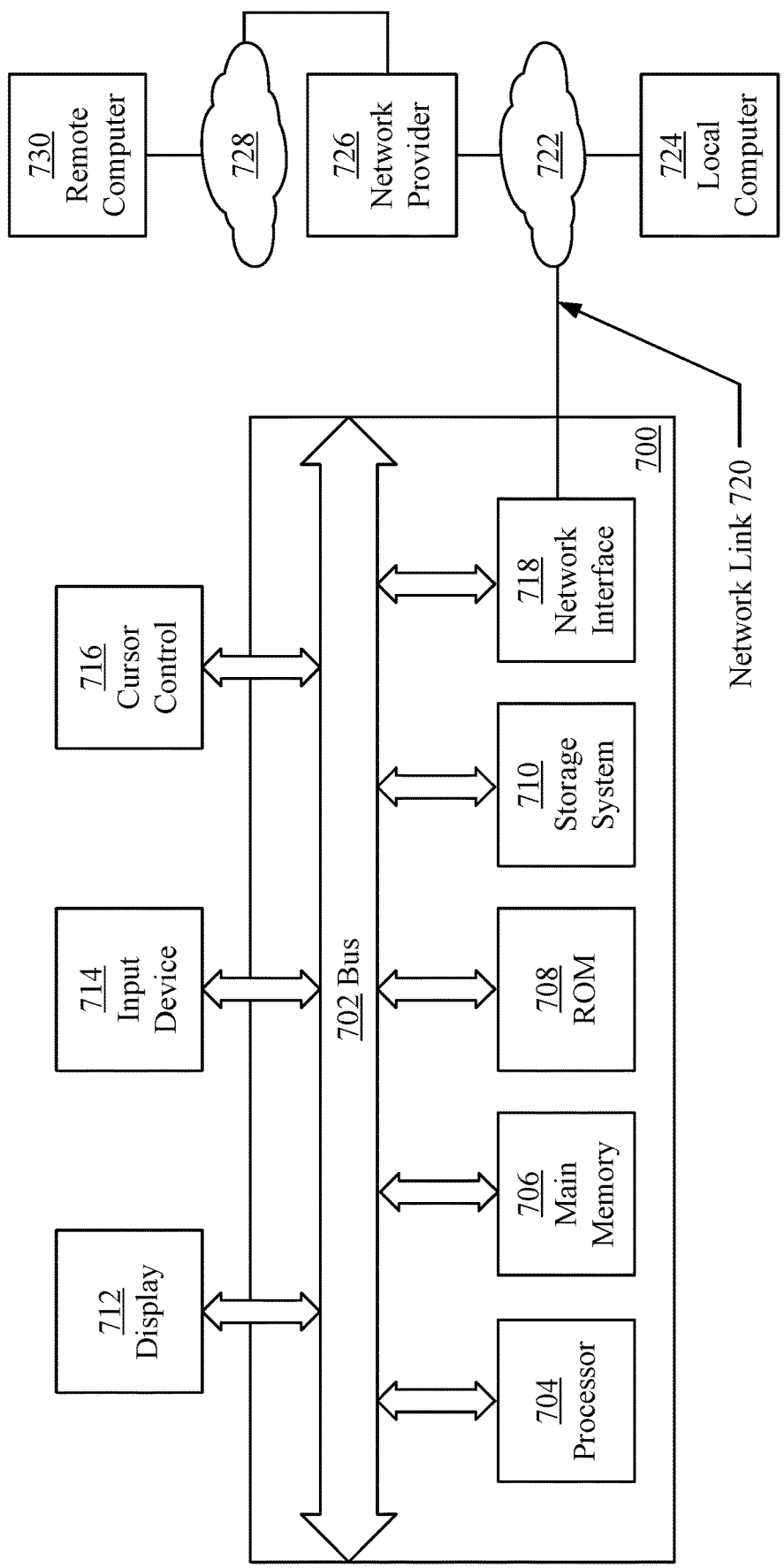
FIG. 7 is a block diagram depicting a computer system upon which some embodiments may be implemented.

FIG. 7 is a block diagram that illustrates an example computer system with which some embodiments may be implemented. In the example of FIG. 7, a computer system 700 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 700 includes an input/output (I/O) subsystem 702 which may include a bus or other communication mechanism(s) for communicating information or instructions between the components of the computer system 700 over electronic signal paths. The I/O subsystem 702 may include an I/O controller, a memory controller and at least one I/O port. The electronic signal paths are represented schematically in the drawings, for example as lines, unidirectional arrows, or bidirectional arrows.

At least one hardware processor 704 is coupled to I/O subsystem 702 for processing information and instructions. Hardware processor 704 may include, for example, a general-purpose microprocessor or microcontroller or a special-purpose microprocessor such as an embedded system or a graphics processing unit (GPU) or a digital signal processor or ARM processor. Processor 704 may comprise an integrated arithmetic logic unit (ALU) or may be coupled to a separate ALU.

Computer system 700 includes one or more units of memory 706, such as a main memory, which is coupled to I/O subsystem 702 for electronically digitally storing data and instructions to be executed by processor 704. Memory 706 may include volatile memory such as various forms of random-access memory (RAM) or other dynamic storage device. Memory 706 also may be used for storing temporary variables or other intermediate information during execution of instructions to be executed by processor 704. Such instructions, when stored in non-transitory computer-readable storage media accessible to processor 704, can render computer system 700 into a special-purpose machine that is customized to perform the operations specified in the instructions.

Computer system 700 further includes non-volatile memory such as read only memory (ROM) 708 or other static storage device coupled to I/O subsystem 702 for storing information and instructions for processor 704. The ROM 708 may include various forms of programmable ROM (PROM) such as erasable PROM (EPROM) or electrically erasable PROM (EEPROM). A unit of persistent storage 710 may include various forms of non-volatile RAM (NVRAM), such as FLASH memory, or solid-state storage, magnetic disk or optical disk such as CD-ROM or DVD-ROM and may be coupled to I/O subsystem 702 for storing information and instructions. Storage 710 is an example of a non-transitory computer-readable medium that may be used to store instructions and data which when executed by the processor 704 cause performing computer-implemented methods to execute the techniques herein.

The instructions in memory 706, ROM 708 or storage 710 may comprise one or more sets of instructions that are organized as modules, methods, objects, functions, routines, or calls. The instructions may be organized as one or more computer programs, operating system services, or application programs including mobile apps. The instructions may comprise an operating system or system software; one or more libraries to support multimedia, programming or other functions; data protocol instructions or stacks to implement TCP/IP, HTTP or other communication protocols; file processing instructions to interpret and render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or NoSQL, an object store, a graph database, a flat file system or other data storage.

Computer system 700 may be coupled via I/O subsystem 702 to at least one output device 712. In some embodiments, output device 712 is a digital computer display. Examples of a display that may be used in some embodiments include a touch screen display or a light-emitting diode (LED) display or a liquid crystal display (LCD) or an e-paper display. Computer system 700 may include other type(s) of output devices 712, alternatively or in addition to a display device. Examples of other output devices 712 include printers, ticket printers, plotters, projectors, sound cards or video cards, speakers, buzzers or piezoelectric devices or other audible devices, lamps or LED or LCD indicators, haptic devices, actuators, or servos.

At least one input device 714 is coupled to I/O subsystem 702 for communicating signals, data, command selections or gestures to processor 704. Examples of input devices 714 include touch screens, microphones, still and video digital cameras, alphanumeric and other keys, keypads, keyboards, graphics tablets, image scanners, joysticks, clocks, switches, buttons, dials, slides, or various types of sensors such as force sensors, motion sensors, heat sensors, accelerometers, gyroscopes, and inertial measurement unit (IMU) sensors or various types of transceivers such as wireless, such as cellular or Wi-Fi, radio frequency (RF) or infrared (IR) transceivers and Global Positioning System (GPS) transceivers.

Another type of input device is a control device 716, which may perform cursor control or other automated control functions such as navigation in a graphical interface on a display screen, alternatively or in addition to input functions. Control device 716 may be a touchpad, a mouse, a trackball, or cursor direction keys for communicating direction information and command selections to processor 704 and for controlling cursor movement on display 712. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 714 may include a combination of multiple different input devices, such as a video camera and a depth sensor.

In some embodiments, computer system 700 may comprise an internet of things (IoT) device in which one or more of the output devices 712, input device 714, and control device 716 are omitted. In some embodiments, the input device 714 may comprise one or more cameras, motion detectors, thermometers, microphones, seismic detectors, other sensors or detectors, measurement devices or encoders and the output device 712 may comprise a special-purpose display such as a single-line LED or LCD display, one or more indicators, a display panel, a meter, a valve, a solenoid, an actuator, or a servo.

When computer system 700 is a mobile computing device, input device 714 may comprise a global positioning system (GPS) receiver coupled to a GPS module that is capable of triangulating to a plurality of GPS satellites, determining and generating geo-location or position data such as latitude-longitude values for a geophysical location of the computer system 700. Output device 712 may include hardware, software, firmware, and interfaces for generating position reporting packets, notifications, pulse or heartbeat signals, or other recurring data transmissions that specify a position of the computer system 700, alone or in combination with other application-specific data, directed toward host 724 or server 730.

Computer system 700 may implement the techniques described herein using customized hard-wired logic, at least one ASIC or FPGA, firmware or program instructions or logic which when loaded and used or executed in combination with the computer system causes or programs the computer system to operate as a special-purpose machine. According to some embodiments, the techniques herein are performed by computer system 700 in response to processor 704 executing at least one sequence of at least one instruction contained in main memory 706. Such instructions may be read into main memory 706 from another storage medium, such as storage 710. Execution of the sequences of instructions contained in main memory 706 causes processor 704 to perform the process steps described herein. In some embodiments, hard-wired circuitry may be used in place of or in combination with software instructions.

The term "storage media" as used herein refers to any non-transitory media that store data or instructions that cause a machine to operate in a specific fashion. Such storage media may comprise non-volatile media or volatile media. Non-volatile media includes, for example, optical or magnetic disks, such as storage 710. Volatile media includes dynamic memory, such as memory 706. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 702. Transmission media can also take the form of acoustic or light waves, such as those generated during radio-wave and infra-red data communications.

Various forms of media may be involved in carrying at least one sequence of at least one instruction to processor 704 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 700 can receive the data on the communication link and convert the data to be read by computer system 700. For instance, a receiver such as a radio frequency antenna or an infrared detector can receive the data carried in a wireless or optical signal and appropriate circuitry can provide the data to I/O subsystem 702 such as place the data on a bus. I/O subsystem 702 carries the data to memory 706, from which processor 704 retrieves and executes the instructions. The instructions received by memory 706 may optionally be stored on storage 710 either before or after execution by processor 704.

Computer system 700 also includes a communication interface 718 coupled to bus 702. Communication interface 718 provides a two-way data communication coupling to network link(s) 720 that are directly or indirectly connected to at least one communication network, such as a network 722 or a public or private cloud on the Internet. For example, communication interface 718 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 722 broadly represents a local area network (LAN), wide-area network (WAN), campus network, internetwork, or any combination thereof. Communication interface 718 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 718 sends and receives electrical, electromagnetic, or optical signals over signal paths that carry digital data streams representing various types of information.

Communication interface 718 can be based on an interconnect technology used for distributed computing systems, supercomputer systems, and high-performance computing systems. For example, communication interface 718 can be based on OMNI-PATH, INFINIBAND, ARIES, NVLINK, TOFU, or Ethernet.

Network link 720 typically provides electrical, electromagnetic, or optical data communication directly or through at least one network to other data devices, using, for example, satellite, cellular, Wi-Fi, or BLUETOOTH technology. For example, network link 720 may provide a connection through a network 722 to a host computer 724.

Furthermore, network link 720 may provide a connection through network 722 or to other computing devices via internetworking devices or computers that are operated by an Internet Service Provider (ISP) 726. ISP 726 provides data communication services through a world-wide packet data communication network represented as internet 728.

A server computer 730 may be coupled to internet 728. Server 730 broadly represents any computer, data center, virtual machine, or virtual computing instance with or without a hypervisor, or computer executing a containerized program system such as DOCKER or KUBERNETES. Server 730 may represent an electronic digital service that is implemented using more than one computer or instance and that is accessed and used by transmitting web services requests, uniform resource locator (URL) strings with parameters in HTTP payloads, API calls, app services calls, or other service calls. Computer system 700 and server 730 may form elements of a distributed computing system that includes other computers, a processing cluster, server farm or other organization of computers that cooperate to perform tasks or execute applications or services. Server 730 may comprise one or more sets of instructions that are organized as modules, methods, objects, functions, routines, or calls. The instructions may be organized as one or more computer programs, operating system services, or application programs including mobile apps. The instructions may comprise an operating system or system software; one or more libraries to support multimedia, programming or other functions; data protocol instructions or stacks to implement TCP/IP, HTTP or other communication protocols; file format processing instructions to interpret or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 730 may comprise a web application server that hosts a presentation layer, application layer and data storage layer such as a relational database system using structured query language (SQL) or NoSQL, an object store, a graph database, a flat file system or other data storage.

Computer system 700 can send messages and receive data and instructions, including program code, through the network(s), network link 720 and communication interface 718. In the Internet example, a server 730 might transmit a requested code for an application program through Internet 728, ISP 726, local network 722 and communication interface 718. The received code may be executed by processor 704 as it is received, or stored in storage 710, or other non-volatile storage for later execution.

The execution of instructions as described in this section may implement a process in the form of an instance of a computer program that is being executed and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 704. While each processor 704 or core of the processor executes a single task at a time, computer system 700 may be programmed to implement multitasking to allow each processor to switch between tasks that are being executed without having to wait for each task to finish. In some embodiments, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In some embodiments, for security and reliability, an operating system may prevent direct communication between independent processes, providing strictly mediated and controlled inter-process communication functionality.

7.0. General Considerations

Although some of various drawings may illustrate a number of logical stages in a particular order, stages that are not order dependent may be reordered and other stages may be combined or broken out. While some reordering or other groupings may be specifically mentioned, others will be obvious to those of ordinary skill in the art, so the ordering and groupings presented herein are not an exhaustive list of alternatives. Moreover, it should be recognized that the stages could be implemented in hardware, firmware, software, or any combination thereof.

The foregoing description, for the purpose of explanation, has been described regarding specific embodiments. However, the illustrative embodiments above are not intended to be exhaustive or to limit the scope of the claims to the precise forms disclosed. Many modifications and variations are possible in view of the above teachings. The embodiments were chosen to best explain the principles underlying the claims and their practical applications, to thereby enable others skilled in the art to best use the embodiments with various modifications as are suited to the uses contemplated.

In the foregoing specification, embodiments of the approach have been described with reference to numerous specific details that may vary from implementation to implementation. The specification and drawings are, accordingly, to be regarded in an illustrative rather than a restrictive sense. The sole and exclusive indicator of the scope of the approach, and what is intended by the applicants to be the scope of the approach, is the literal and equivalent scope of the set of claims that issue from this application, in the specific form in which such claims issue, including any subsequent correction.

Any definitions set forth herein for terms contained in the claims may govern the meaning of such terms as used in the claims. No limitation, element, property, feature, advantage, or attribute that is not expressly recited in a claim should limit the scope of the claim in any way. The specification and drawings are to be regarded in an illustrative rather than a restrictive sense.

As used herein the terms "include" and "comprise" (and variations of those terms, such as "including," "includes," "comprising," "comprises," "comprised" and the like) are intended to be inclusive and are not intended to exclude further features, components, integers, or steps.

References in this document to "an embodiment," indicate that the embodiment described or illustrated may include a particular feature, structure, or characteristic, but every embodiment may not necessarily include the particular feature, structure, or characteristic. Such phrases are not necessarily referring to the same embodiment. Further, when a particular feature, structure, or characteristic is described or illustrated in connection with an embodiment, it is believed to be within the knowledge of one skilled in the art to affect such feature, structure, or characteristic in connection with other embodiments whether or not explicitly indicated.

Various features of the disclosure have been described using process steps. The functionality/processing of a given process step could potentially be performed in different ways and by different systems or system modules. Furthermore, a given process step could be divided into multiple steps and/or multiple steps could be combined into a single step. Furthermore, the order of the steps can be changed without departing from the scope of the present disclosure.

It will be understood that the embodiments disclosed and defined in this specification extend to alternative combinations of the individual features and components mentioned or evident from the text or drawings. These different combinations constitute various alternative aspects of the embodiments.

What is claimed is:

1. A proxy server comprising:
one or more computer processors;
storage media; and
instructions stored in the storage media that, when executed by the one or more computer processors, cause the one or more computer processors to perform:
receiving, at the proxy server, a request from a source host, to establish a first communications connection between the source host and a destination host;
establishing, by the proxy server, a second communications connection between the source host and the proxy server;
determining a plurality of fingerprint values specific to the source host;

wherein the plurality of fingerprint values specific to the source host is determined based on, at least in part, a SYN packet communicated from the source host to the proxy server during a three-way handshake process performed to establish the second communications connection;

establishing by the proxy server, using at least the plurality of fingerprint values specific to the source host, a third communications connection between the proxy server and the destination host;

facilitating, by the proxy server, communications between the source host and proxy server via the second communications connection and between the proxy server and the destination host via the third communications connection.

2. The proxy server of claim 1, wherein the establishing by the proxy server, using at least the plurality of fingerprint values specific to the source host, a third communications connection comprises:

based on, at least in part, the plurality of fingerprint values, generating an interface configured to establish the third communications connection between the proxy server and the destination host;

using the interface to establish the third communications connection between the proxy server and the destination host.

3. The proxy server of claim 2, wherein the interface is configured to overwrite one or more default TCP options for the third communications connection using one or more of the plurality of fingerprint values when the one or more of the plurality of fingerprint values are different than the one or more default TCP options.

4. The proxy server of claim 3, wherein the one or more default TCP options are provided based on an operating system executing on the source host.

5. The proxy server of claim 1, wherein the plurality of fingerprint values specific to the source host is determined based on, at least in part, an identification of an operating system executing on the source host.

6. The proxy server of claim 1, wherein the plurality of fingerprint values specific to the source host is determined based on, at least in part, an ACK packet communicated from the source host to the proxy server during a three-way handshake process performed to establish the second communications connection.

7. A computer-implemented method comprising:

receiving, at a proxy server, a request from a source host, to establish a first communications connection between the source host and a destination host;

establishing, by the proxy server, a second communications connection between the source host and the proxy server;

determining a plurality of fingerprint values specific to the source host;

wherein the plurality of fingerprint values specific to the source host is determined based on, at least in part, a SYN packet communicated from the source host to the proxy server during a three-way handshake process performed to establish the second communications connection;

establishing by the proxy server, using at least the plurality of fingerprint values specific to the source host, a third communications connection between the proxy server and the destination host;

facilitating, by the proxy server, communications between the source host and proxy server via the second communications connection and between the proxy server and the destination host via the third communications connection.

8. The computer-implemented method of claim 7, wherein the establishing by the proxy server, using at least the plurality of fingerprint values specific to the source host, a third communications connection comprises:

based on, at least in part, the plurality of fingerprint values, generating an interface configured to establish the third communications connection between the proxy server and the destination host;

using the interface to initiate the third communications connection between the proxy server and the destination host.

9. The proxy server of claim 8, wherein the interface is configured to overwrite one or more default TCP options for the third communications connection using one or more of the plurality of fingerprint values when the one or more of the plurality of fingerprint values are different than the one or more default TCP options.

10. The proxy server of claim 9, wherein the one or more default TCP options are provided based on an operating system executing on the source host.

11. The computer-implemented method of claim 7, wherein the plurality of fingerprint values specific to the source host is determined based on, at least in part, an identification of an operating system executing on the source host.

12. The computer-implemented method of claim 7, wherein the plurality of fingerprint values specific to the source host is determined based on, at least in part, an ACK packet communicated from the source host to the proxy server during a three-way handshake process performed to establish the second communications connection.

13. A computer-readable storage media storing one or more instructions which, when executed by one or more processors, cause the one or more processors to perform:

receiving, at a proxy server, a request from a source host, to establish a first communications connection between the source host and a destination host;

establishing, by the proxy server, a second communications connection between the source host and the proxy server;

determining a plurality of fingerprint values specific to the source host;

wherein the plurality of fingerprint values specific to the source host is determined based on, at least in part, a SYN packet communicated from the source host to the proxy server during a three-way handshake process performed to establish the second communications connection;

establishing by the proxy server, using at least the plurality of fingerprint values specific to the source host, a third communications connection between the proxy server and the destination host;

facilitating, by the proxy server, communications between the source host and proxy server via the second communications connection and between the proxy server and the destination host via the third communications connection.

14. The computer-readable storage media of claim 13, wherein the plurality of fingerprint values specific to the source host is determined based on, at least in part, an identification of an operating system executing on the source host.

15. The computer-readable storage media of claim 13, wherein the plurality of fingerprint values specific to the source host is determined based on, at least in part, an ACK packet communicated from the source host to the proxy server during a three-way handshake process performed to establish the second communications connection.

16. The computer-readable storage media of claim 13, wherein the establishing by the proxy server, using at least the plurality of fingerprint values specific to the source host, a third communications connection comprises:
- based on, at least in part, the plurality of fingerprint values, generating an interface configured to establish the third communications connection between the proxy server and the destination host;
- using the interface initiating the third communications connection between the proxy server and the destination host;
- wherein the interface is configured to overwrite one or more default TCP options for the third communications connection using any of the plurality of fingerprint values;
- wherein the interface is configured to overwrite one or more default TCP options for the third communications connection using any of the plurality of fingerprint values.

* * * * *